(12) United States Patent
Fischer

(10) Patent No.: US 6,325,409 B1
(45) Date of Patent: Dec. 4, 2001

(54) CONNECTING LINE FOR A GAS BAG-TYPE OCCUPANT PROTECTION SYSTEM

(75) Inventor: Anton Fischer, Leinweiler (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/259,995

(22) Filed: Mar. 1, 1999

(30) Foreign Application Priority Data

Mar. 6, 1998 (DE) .................................. 298 04 004
Jul. 30, 1998 (DE) .................................. 298 13 636

(51) Int. Cl.⁷ .................................................. B60R 21/22
(52) U.S. Cl. ........................ 280/730.2; 280/729; 280/730
(58) Field of Search ..................... 280/736, 743.1, 280/742, 730.1, 729, 730.2, 749, 752, 740

(56) References Cited

U.S. PATENT DOCUMENTS

| 3,602,526 | * | 8/1971 | Brawn .................................. 280/740 |
| 5,791,683 | * | 8/1998 | Shibata et al. ..................... 280/730.2 |
| 5,845,935 | * | 12/1998 | Enders et al. ...................... 280/743.2 |
| 5,899,491 | * | 5/1999 | Tschaeschke ....................... 280/730.2 |
| 5,992,877 | * | 11/1999 | Gray .................................... 280/730.1 |
| 6,070,903 | * | 6/2000 | Beisswenger et al. .............. 280/740 |
| 6,164,688 | | 12/2000 | Einsiedel et al. . |

FOREIGN PATENT DOCUMENTS

| 1956677 | 6/1970 | (DE) . |
| 19613133 | 10/1997 | (DE) . |
| 19627181 | 1/1998 | (DE) . |
| 29804004 | 8/1998 | (DE) . |

* cited by examiner

*Primary Examiner*—Lanna Mai
*Assistant Examiner*—Hau Phan
(74) *Attorney, Agent, or Firm*—Tarolli, Sundheim, Covell, Tummino & Szabo L.L.P.

(57) ABSTRACT

A connecting line is intended to connect a gas bag for a gas bag-type occupant protection system with a gas generator. The connecting line includes a gas exit section intended to be arranged within a gas bag and having outer surface area. The gas exit section is provided with at least one gas exit port. The gas exit port has at least one gas guidance surface area which extends from the outer surface area of the gas exit section into the interior of the gas exit section of the said connecting line with a predetermined depth.

17 Claims, 4 Drawing Sheets

CONNECTING LINE FOR A GAS BAG-TYPE OCCUPANT PROTECTION SYSTEM

The invention relates to a connecting line for a gas bag-type occupant protection system.

BACKGROUND OF THE INVENTION

Connecting lines for gas bag systems are provided for inflating a gas bag with compressed gas and comprise a gas exit section extending into the gas bag, this gas exit section being provided with at least one gas exit port.

Gas bag-type occupant protection systems serve, for example, to protect the heads of vehicle occupants in case of a side impact collision. For this purpose a gas bag is deployed between the side windows and the head of the vehicle occupant in case of a collision. The gas bag is generally inflated by an inflator arranged on the C-pillar of the vehicle, this inflator being connected to the gas bag by a connecting line of the aforementioned kind. For the gas bag extending along the side windows of the vehicle to be able to be inflated uniformly the connecting line comprises a gas exit section extending by a considerable length into the gas bag. This gas exit section is also termed a gas lance and is provided with a plurality of gas exit ports. Due to this arrangement gas emerges over a considerable length of the gas bag which, depending on the type of vehicle involved, may amount to, for example, approximately 1.2 m, and the gas bag is uniformly inflated. The gas exit ports are usually formed by milled slots, roughly two to four such slots being provided within the gas bag. Since the gas on deployment of the gas bag flows within the gas lance at a very high velocity extending into the supersonic range, the slots must be of considerable length so that a sufficient amount of gas is able to exit laterally from the gas lance. Accordingly, milling these slots is time-consuming and expensive. In addition to this the milled gas exit ports weaken the structure of the gas lance and are difficult to deburr.

It is the object of the invention to simplify the manufacturing of the connecting line for a gas bag-type occupant protection system.

BRIEF DESCRIPTION OF THE INVENTION

To this end, the invention provides a connecting line intended to connect a gas bag for a gas bag-type occupant protection system with a gas generator. The connecting line comprises a gas exit section intended to be arranged within a gas bag and having outer surface area. The gas exit section is provided with at least one gas exit port. The gas exit port has at least one gas guidance surface area which extends from the outer surface area of the gas exit section into the interior of the gas exit section of the said connecting line with a predetermined depth. Due to such a geometry each gas exit port features a gas guidance surface area by which the gas flowing in the gas exit section of the connecting line is forced to exit laterally. In this arrangement, the branching gas flow can be influenced in regard to its direction and extent by changing the geometry of the gas exit port. The gas exit port may be fabricated by indentation or embossing. The gas exit port may be fabricated in a single operation for example by means of a combined embossing/cutting punch. Small tolerances are achieved in production when a cutting die is drawn along in the interior of the connecting line in the manufacturing process.

In one aspect of the invention the gas guidance surface area comprises in the predetermined depth at least one end face oriented towards a main flow direction of the gases in the connecting line. Configuring the gas guidance surface area in this way causes an outflow of the gases substantially in a plane parallel to the cross-section of the connecting line.

In another aspect it is proposed that the gas exit port comprises at least one boundary located in the outer surface area of the gas exit section and oriented parallel to the main flow direction and that the gas guidance surface area is formed by an indented portion of the wall of the gas exit section of the connecting line, this indention being located on the side of the boundary relative to the main flow direction. In this way a flow-favoring geometry can be created by simple means of fabrication without the need of fitting additional parts to the connecting line. The dimensions of the indented portion influence the direction and quantity of the outflowing gas.

In yet a further aspect of the invention it is also proposed that the gas guidance surface area is formed by a portion of the wall of the gas exit section of the connecting line, that is indented between two boundaries located parallel to the main flow direction. As a result of this, the open cross-section of the gas exit port available for outflow of the gas can be enlarged without changing the depth of the gas exit port.

It is likewise of advantage that the gas guidance surface area extends opposite a main direction of gas flow in the connecting line toward the gas bag obliquely down from the outer surface area of the gas exit section of the connecting line to a predetermined depth into the interior of the connecting line. Due to such a gilled geometry the gas flowing in the connecting line is deflected directly from its main flow direction, and the gas flowing in the gas exit section of the connecting line is forced to exit laterally. In this arrangement, the branching gas flow can be influenced as regards its direction and extent by changing the geometry of the gas exit port.

The gas guidance surface area may be configured so that it comprises in the predetermined depth an end face facing the main flow direction and that the width of the gas guidance surface area reduces from the end face toward the outer surface area of the gas exit section of the connecting line. The gas guidance surface area is preferably curved convex. For example, flow-favoring geometries of the gas exit port may be produced by varying the penetration depth of a circular cone-shaped punch, the gas guidance surface area as viewed from above then having essentially a triangular or hyperbola-like curved rim.

In still another aspect of the invention the gas exit section of the connecting line extending into the gas bag comprises a plurality of gas exit ports arranged in series in the main flow direction, the cross-section of the gas exit ports perpendicular to the main flow direction for the gas exit ports located further downstream in the main flow direction being larger than that of the gas exit ports located further upstream. In this way the drop in pressure of the gas along the connecting line can be compensated so that the outflow of gas at all gas exit ports is the same in quantity.

It is also proposed that the predetermined depth of the gas exit ports located further downstream in the main flow direction is larger than that of the gas exit ports located further upstream, this enabling the cross-section available for the gas passage to be increased by simple means.

BRIEF DESCRIPTION OF THE DRAWINGS

Further features and advantages of the invention read from the following description and are evident from the drawing to which reference is made and in which.

DETAILED DESCRIPTION OF THE INVENTION

Figure 1:
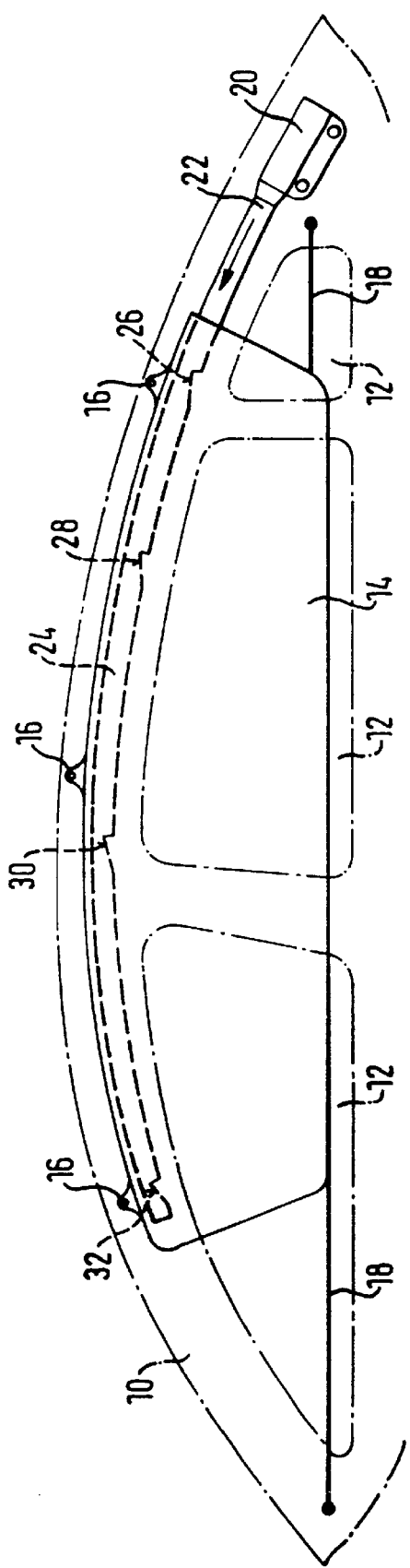
FIG. 1 is a schematic side view of a first embodiment of a gas bag-type occupant protection system in accordance with the invention.

Referring now to FIG. 1 there is illustrated a gas bag-type occupant protection system in accordance with the invention arranged on a vehicle structure 10 indicated dot-dashed. Indicated in this vehicle structure 10 are side windows 12. A gas bag 14 covers the side windows at least in part when deployed and is connected to the vehicle structure 10 via fastening points 16 and tensioning straps 18. Inflating the gas bag 14 is done by an inflator 20 which is connected to the gas bag 14 via connecting line 22. The main direction of flow of the gases in the connecting line 22 to the gas bag 14 is indicated by the arrow. Extending within the gas bag 14 is a gas exit section 24 of the connecting line 22 which is provided with a plurality of gas exit ports 26, 28, 30 and 32. The spacing of the gas exit ports 26, 28, 30 and 32 is greater between the gas exit ports 30 and 32 located further downstream in the main flow direction than between the gas exit ports 26 and 28 located further upstream. The gas exit ports 26 to 32 serve to ensure uniform inflation of the gas bag 14 during its deployment.

Figure 2:
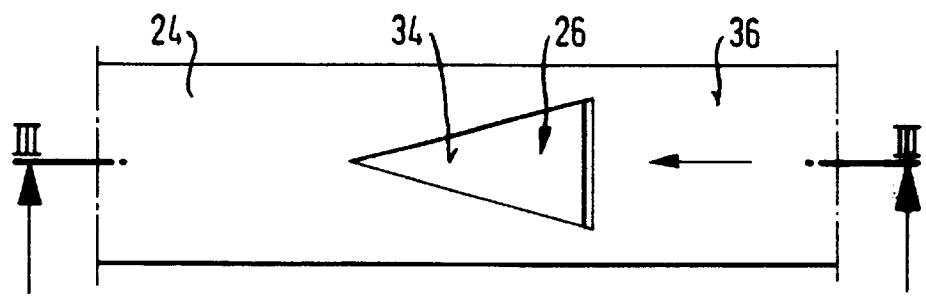
FIG. 2 shows a portion of the connecting line as shown in FIG. 1 in the region of a gas exit port as seen from above.

Referring now to FIG. 2 there is illustrated the gas exit section 24 with the gas exit port 26 as seen from above. Here too, the main direction of flow of the gases is indicated by an arrow. As viewed from above the gas exit port 26 is triangular in shape, the width of which diminishes in the main flow direction.

Figure 3:
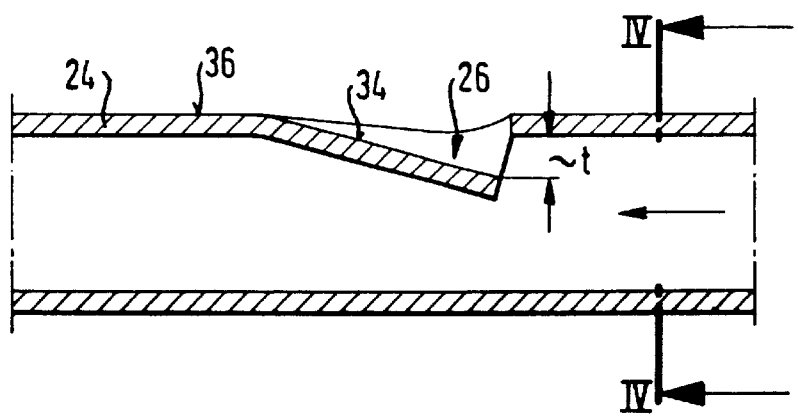
FIG. 3 is a section view of the gas exit section of the connecting line as shown in FIG. 2 taken along the line III—III.

Referring now to FIG. 3 there is illustrated a section view of the gas exit section 24 of the connecting line 22 in the region of the gas exit port 26. The gas exit port 26 comprises a gas guidance surface area 34 oriented opposite the main flow direction as indicated by the arrow, and extending from the outer surface area 36 of the gas exit section 24 down to a predetermined depth t into the interior of the gas exit section 24 of the connecting line 22. The gas guidance surface area is formed by an indented part of the wall of the gas exit section acting as a guide plate. Gas flowing along gas exit section 24 of the connecting line 22 is diverted by the gas guidance surface area 34 from the main flow direction and guided into the interior of the gas bag. Direction and quantity of the diverted gas flow depend on the depth t and other dimensions of the cross-section of the gas exit port 26 available for gas passage as well as on the angle of inclination of the gas guidance surface area 34 relative to the main flow direction.

Figure 4:
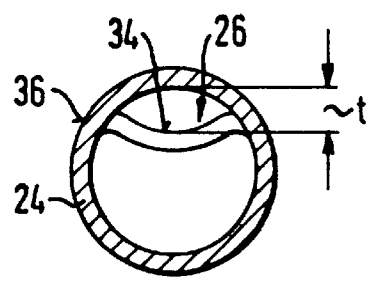
FIG. 4 is a section view of the gas exit section of the connecting line as shown in FIG. 3 taken along the line IV—IV.

Referring now to FIG. 4 there is illustrated a section view of the gas exit section 24 as taken along the line IV—IV in FIG. 3. In the view as evident from FIG. 4 the gas guidance surface area 34 is curved in the shape of a circular segment in a plane perpendicular to the main flow direction. It is thus evident from FIGS. 2, 3 and 4 that the gas guidance surface area 34 is formed by indenting the wall of the gas exit section 24 of the connecting line, this gas guidance surface area being convex and the indentation being achieved by a punch in the shape of a circular cone tapered in the main flow direction. This punch is a combined embossing/cutting punch which incises the gas exit section 24 transversely to the main flow direction and forms the gas exit port 26 down to the depth t, i.e. the gas exit port 26 being formed in a single operation. When employing a plurality of such embossing/cutting punches a plurality of gas exit ports 26, 28, 30 and 32 can be produced at the same time in the gas exit section 24 of the connecting line 22. The gas exit ports 26, 28, 30 and 32 may be produced without machining, any burrs resulting from cutting thus being located in the interior of the connecting line 22 so that the gas bag can not be damaged.

Figure 5:
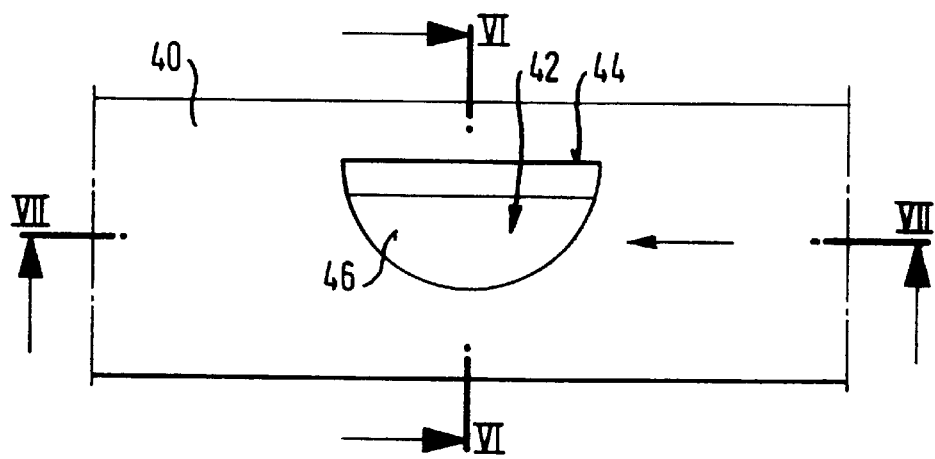
FIG. 5 shows a portion of a second embodiment of a connecting line in accordance with the invention in the region of a gas exit port as seen from above.

Referring now to FIG. 5 there is illustrated a view as seen from above of a gas exit section 40 of a connecting line having a gas exit port 42. The gas exit port 42 comprises a boundary 44 located in the outer surface area of the gas exit section 40, this boundary being oriented parallel to the main flow direction as indicated by the arrow. A gas guidance surface area 46 is formed by indenting a portion of the wall of the gas exit section 40, this portion being located to the side of the boundary 44. As viewed from above the gas guidance surface area 46 has substantially the shape of a circular segment.

Figure 6:
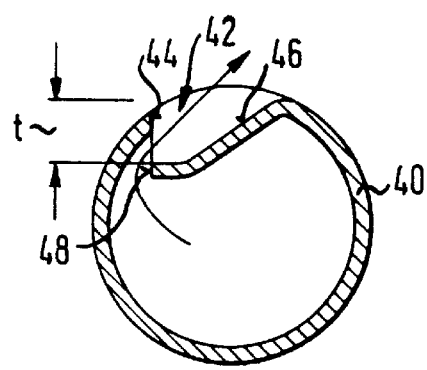
FIG. 6 is a section view of the gas exit section as shown in FIG. 5 taken along the line VI—VI.
Figure 7:
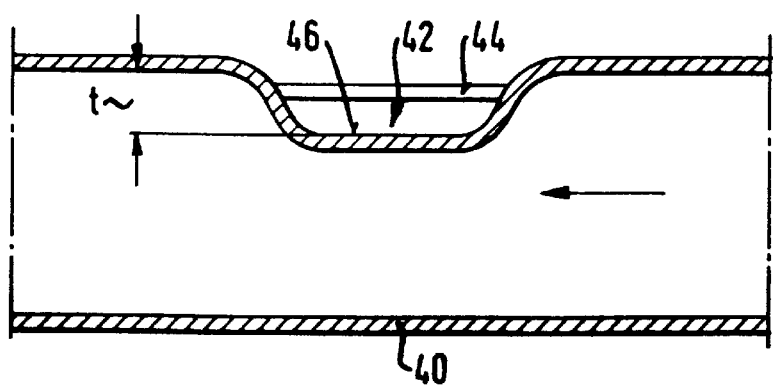
FIG. 7 is a section view of the gas exit section as shown in FIG. 5 taken along the line VII—VII.

Referring now to FIGS. 6 and 7 there is illustrated the gas guidance surface area 46 extending obliquely into the interior of the gas exit section 40 and comprising in the depth t a end face 48 oriented parallel to the main flow direction of the gases in the connecting line. For producing the gas exit port 42 as shown in FIG. 6 the gas exit section 40 is cut open along the boundary 44 and subsequently the gas guidance surface area 46 is configured by indenting a portion of the outer surface area located laterally of the boundary 44. The arrow as evident from FIG. 6 illustrates the main outflow direction of the gases from the gas exit port 42.

Figure 8:
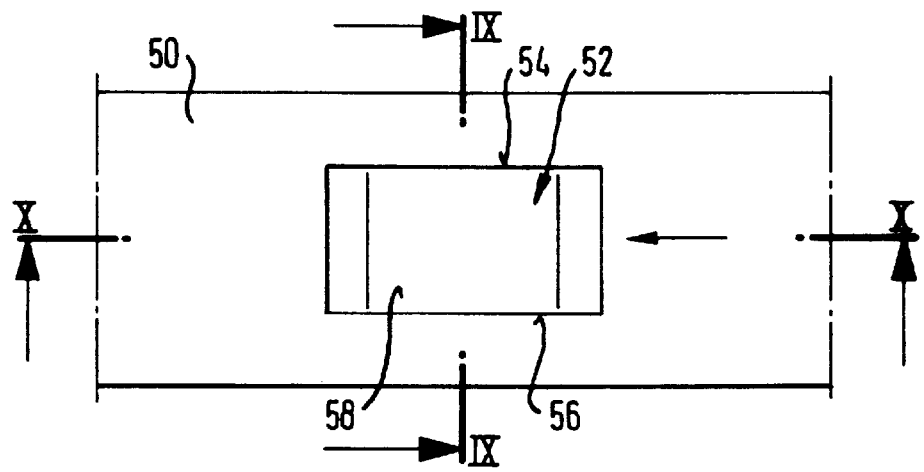
FIG. 8 shows a portion of a third embodiment of the connecting line in accordance with the invention in the region of a gas exit port as seen from above.

Referring now to FIG. 8 there is illustrated an embodiment of the invention in which in a gas exit section 50 of a connecting line a gas exit port 52 is configured. The gas exit port 52 comprises two boundaries 54 and 56 located parallel to the main flow direction as indicated by an arrow, it being between these boundaries that a portion of the wall of the gas exit section 50 is indented. This indented portion forms the gas guidance surface area 58 consisting of three sections.

Figure 9:
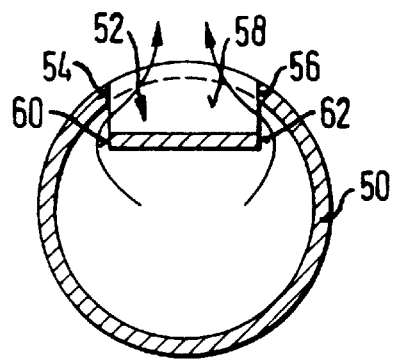
FIG. 9 is a section view of the gas exit section as shown in FIG. 8 taken along the line IX—IX and FIG. 10 is a section view of the gas exit section as shown in FIG. 8 taken along the line X—X.

Referring now to FIG. 9 the main outflow direction of the gases from the gas exit port 52 is indicated by two arrows: on both sides of the gas guidance surface area 58 gas escapes from the gas exit section 50 through the open cross-section formed between the boundaries 54 and 56 and the end faces 60 and 62 of the gas guidance surface area 58.

Figure 10:
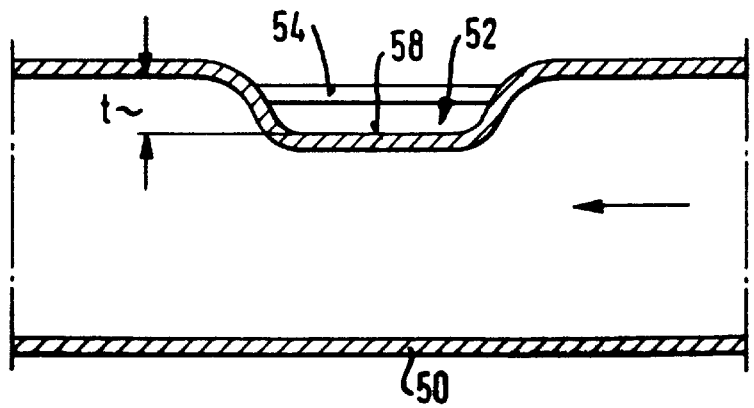

Referring now to FIG. 10 there is illustrated a section view indicating that the gas guidance surface area 58 comprises a first section extending from the outer surface area of the gas exit section 50 obliquely down to the depth t into the interior of the gas exit section 50, a second section running parallel to the main flow direction as indicated by the arrow, in the depth t, and a third section running from the depth t obliquely to the outer surface area.

What is claimed is:

1. Apparatus comprising:
    a gas bag for a gas bag-type occupant protection system;
    a gas generator for providing gas for inflating said gas bag; and
    a connecting line having an end connected in fluid communication with said gas generator, said connecting line leading a gas flow from said gas generator into said gas bag, said connecting line having a gas exit section and an outer surface area, said gas exit section extending away from said gas generator and being arranged within said gas bag, said gas exit section being provided with at least one gas exit port, said gas exit port having at least one gas guidance surface area for diverting a part of said gas flow from the interior of said connecting line through said gas exit port, said guidance surface extending from said outer surface area of said gas exit section into the interior of said gas exit section of said connecting line with a predetermined depth.

2. The connecting line of claim 1, wherein said gas guidance surface area extends obliquely into the interior of said gas exit section of said connecting line.

3. The connecting line of claim 1, wherein said gas guidance surface area comprises at least one end face oriented opposite a main flow direction of gas in said connecting line and arranged in said predetermined depth.

4. The connecting line of claim 3, wherein said gas exit port comprises at least one boundary ted in said outer surface area of said gas exit section and oriented parallel to said main flow direction, said gas surface area being formed by an indented portion of a wall of said gas exit section, said indention being positioned laterally of said boundary as viewed relatively to said main flow direction.

5. The connecting line of claim 4, wherein said gas guidance surface area is formed by a portion of said wall of said gas exit section, two boundaries being formed opposite each other, said portion being indented between said boundaries which are located parallel to said main flow direction.

6. The connecting line of claim 3, wherein said gas guidance surface area is formed, as viewed in said main flow direction, by a first section extending from said outer surface area of said gas exit section with a predetermined depth into the interior of said gas exit section, a second section extending in said predetermined depth, and a third section extending from said predetermined depth outwards to said outer surface area of said gas exit section.

7. The connecting line of claim 1, wherein said gas guidance surface area extends opposite to a main flow direction of gas in said connection line and obliquely from said outer surface area of said gas exit section into the interior of said gas exit section with a predetermined depth.

8. The connecting line of claim 7, wherein said gas guidance surface area is formed by an indented part of a wall of said gas exit section.

9. The connecting line of claim 8, wherein said gas guidance surface area comprises an end face arranged in said predetermined depth oriented opposite said main flow direction.

10. The connecting line of claim 9, wherein said gas guidance surface area has a width which reduces from said end face towards said outer surface area of said gas exit section.

11. The connecting line of claim 1, wherein said gas guidance surface area is convexly curved.

12. The connecting line of claim 1, wherein said gas exit section comprises a plurality of said gas exit ports arranged in sequence along a main flow direction, each gas exit port having a cross-section perpendicular to said main flow direction, said cross-section of said gas exit ports located further downstream in said main flow direction being larger than that of said gas exit ports located further upstream.

13. The connecting line of claim 12, wherein said predetermined depth of said gas exit ports located further downstream in said main flow direction is larger than that of said gas exit ports located further upstream.

14. The connecting line of claim 1, wherein said gas exit section comprises a plurality of gas exit ports arranged in sequence along a main low direction, said gas exit ports located further downstream in said main flow direction being separated from each other with a larger distance than said gas exit ports located further upstream.

15. Apparatus as defined in claim 1, wherein said gas exit section is spaced away from said end of said gas connecting line.

16. A vehicle occupant protect ion system comprising:
    an inflatable gas bag inflatable into a position adjacent a side structure of the vehicle and at least one side window of the vehicle;
    a gas generator actuatable to provide gas for inflating said inflatable gas bag; and
    a connecting line having an end connected in fluid communication with said gas generator, said connecting line leading a gas flow from said gas generator into said gas bag, said connecting line having a gas exit section and an outer surface area, said gas exit section extending away from said gas generator and being arranged within said gas bag, said gas exit section being provided with at least one gas exit port, said gas exit port having at least one gas guidance surface area for diverting a part of said gas flow from the interior of said connecting line through said gas exit port, said guidance surface extending from sail outer surface area of said gas exit section into the interior of said gas exit section of said connecting line with a predetermined depth.

17. Apparatus comprising:
    a gas bag for a gas bag-type occupant protection system;
    a gas generator for providing gas for inflating said gas bag; and
    a gas connecting line having a gas exit section extending away from said gas generator and being arranged within said gas bag, said gas connecting line including at least one gas exit port positioned along said gas exit section, said gas connecting line directing said inflation gas from said gas generator through said at least one gas exit port into said gas bag when said gas generator is actuated, said at least one gas exit port comprising an incision in said gas connecting line extending transversely to a gas flow direction of said gas connecting line and an indented portion of said gas connecting line adjacent said incision.

* * * * *

UNITED STATES PATENT AND TRADEMARK OFFICE
CERTIFICATE OF CORRECTION

PATENT NO. : 6,325,409 B1
DATED : December 4, 2001
INVENTOR(S) : Anton Fischer

It is certified that error appears in the above-identified patent and that said Letters Patent is hereby corrected as shown below:

<u>Column 5,</u>
Line 36, change "ted" to -- located --.
Line 57, change "connection" to -- connecting --.

<u>Column 6,</u>
Line 20, change "low" to -- flow --.
Line 44, change "sail" to -- said --.

Signed and Sealed this

Twenty-third Day of April, 2002

Attest:

*Attesting Officer*

JAMES E. ROGAN
*Director of the United States Patent and Trademark Office*